United States Patent [19]

Wengler et al.

[11] 4,352,707
[45] Oct. 5, 1982

[54] COMPOSITE REPAIR APPARATUS

[75] Inventors: Leonard M. Wengler, Sayville; Harold J. Wicker, Commack; Michael J. Masica, Jr., Port Jefferson Station, all of N.Y.

[73] Assignee: Grumman Aerospace Corporation, Bethpage, N.Y.

[21] Appl. No.: 256,699

[22] Filed: Apr. 23, 1981

[51] Int. Cl.³ .......................................... G05G 15/00
[52] U.S. Cl. .................................... 156/359; 156/94; 156/285; 156/382; 219/477; 219/484; 219/528; 219/535
[58] Field of Search ................... 156/94, 97, 285, 286, 156/382, 583.3, 583.1, 359; 219/535, 528, 539, 484, 486, 508, 477; 248/363

[56] References Cited

U.S. PATENT DOCUMENTS

| | | | |
|---|---|---|---|
| 2,123,549 | 7/1938 | Williams | 248/363 |
| 3,033,298 | 5/1962 | Johnson | 248/363 X |
| 3,837,965 | 9/1974 | Mahon et al. | 156/94 X |
| 3,951,724 | 4/1976 | Johnson et al. | 156/382 |
| 3,996,091 | 12/1976 | Daunt et al. | 156/285 |
| 4,140,050 | 2/1979 | Giddings | 156/359 X |
| 4,162,393 | 7/1979 | Balboni | 219/528 X |
| 4,279,255 | 7/1981 | Hoffman | 219/535 X |

Primary Examiner—David A. Simmons
Attorney, Agent, or Firm—John P. Kozma; Richard G. Geib

[57] ABSTRACT

A composite repair device including a plurality of resistive heating zones, each having independent temperature and rate of temperature rise controls, to compensate for the greater heat loss at the outer areas of a composite patch.

7 Claims, 3 Drawing Figures

COMPOSITE REPAIR APPARATUS

BACKGROUND

This invention relates to composite repair devices in general, and in particular to composite repair devices having resistive heating elements and vacuum drawing means.

The increasing use of composite materials, especially in aircraft structure, has been paralleled by advances in techniques for repairing damaged composite structures. In fact, much of the technology for repair of composites is drawn from the composite forming art itself. In general, the resinous materials forming a composite matrix must be heated to effect curing, and pressure must be applied during curing to insure a proper bond between the laminates suspended in the matrix as well as to insure proper conforming of the composite structure to a mold.

Pressure may be applied to a surface by enclosing the article bearing such surface in a non-porous closure or bag capable of being evacuated and sealed. In this manner a uniform pressure of up to one atmosphere may be applied across the entire surface area in contact with the bag. An example of a prior art device employing this technique is found in U.S. Pat. No. 2,331,296, issued to Bendix.

Several methods of applying heat to effect a cure of the composite adhesive have been used, with varying satisfaction, in prior art devices. In Bendix, for example, heat is applied by circulating an externally heated fluid in a chamber surrounding the evacuated bag. U.S. Pat. No. 2,489,643, issued to Hunter, teaches that the rubber or flexible material of the vacuum bag itself may be made electrically conductive in portions and heated by passing an electric current therethrough. The conductive portions are formed of rubber or other suitably flexible materials impregnated with powdered graphite, carbon black, or powdered metal.

A portable repair apparatus which combines a flexible diaphragm with an integrally formed resistive heating element is found in U.S. Pat. No. 3,837,965, issued to Mahon, et al. The diaphragm of the Mahon device includes a flange which forms an integral, vacuum tight seal when placed against the surface to be repaired, and the Mahon heating element comprises a coil embedded in the diaphragm. It is seen, then, that the Mahon apparatus combines various features from composite forming devices to provide a repair apparatus which is portable, capable of applying uniform pressure to a contoured surface, and which includes its own heat source.

A shortcoming of the Mahon device, however, is that the heat loss from the surface being patched is greater at the outer area of the patch than at the center. Furthermore, this center to edge heat loss differential will vary from one repair job to the next according to the thermal properties of the damaged surface, making it extremely difficult to apply a proper uniform curing temperature, for any given surface to be repaired, across the entire area of the patch. This is a severe limitation for patch materials which must be cured within a very narrow temperature range.

A further shortcoming of Mahon and other prior art devices is that the curing cycle must be controlled manually. Typically the heating elements of prior art designs would burn out due to overheating if allowed to remain on for more than ten minutes at a stretch, since the heat thus produced cannot be instantaneously dissipated throughout the system. Thus, an operator was required to stand by the device to periodically shut off the heater until the temperature stabilized.

Furthermore, some patch materials not only require curing at a specific temperature, but in addition must be brought from room temperature (uncured) to curing temperature at a controlled rate. The desired rate of temperature rise is determined by the particular patching material used. For boron-epoxy patches, for example, a rate of temperature rise of 6° to 7° Farenheit per minute is desirable. For newer composite materials, such as graphite-epoxy, even slower rise times, less than 5° F./min., must be obtained.

At best, then, control of the curing cycle for composite repairs is a delicate process, even with proper temperature monitoring equipment.

SUMMARY OF THE INVENTION

It is, therefore, a primary object of this invention to provide a composite repair device capable of evenly heating a patch area from center to edge regardless of the thermal properties of the surface to which the patch is applied.

A further object of the present invention is to provide a composite repair device having a flexible diaphragm with a vacuum-tight flange which will conform to the contour of the surface to be repaired.

A still further object of this invention is to provide a composite repair device which is both portable and adaptable to a wide variety of aircraft or other surfaces to be repaired.

Yet a further object of the present invention is to provide an automatic control for a composite repair device which will allow independent control of curing temperature and rate of temperature rise.

One still further object of the present invention is to provide a composite repair device with a single timer to control both the heating element and the vacuum pump.

It is yet a further object of this invention to provide an automatic composite repair device with a means for recording a temperature versus time plot of the curing cycle.

The above objects and advantages are accomplished in brief by providing a blanket or diaphragm with three separately controlled heat zones of varying watt density. Each of the three heat zones is in turn provided with a separate temperature probe and automatic control circuit which may be adjusted by the operator for a desired temperature and rate of temperature rise. Thus, separate control of heat zones located to compensate for greater heat loss at the outer area of the patch allows for even heating on surfaces regardless of thermal conductivities.

Pressure is applied to the patch area by means of a vacuum pump and hose connected to a series of concentric, air-tight grooves in the bottom of the diaphragm or blanket in which the heating element is integrally formed.

A further feature of the present invention is a timer control which will automatically turn off the heating element after a desired curing time, and shut down the vacuum pump an hour later, after the patch has had sufficient time to cool below 150° F.

The present invention will satisfy the need for a versatile, easy-to-use shipboard composite repair device, adaptable to aircraft repair and a variety of other military and civilian uses.

BRIEF DESCRIPTION OF THE DRAWINGS

The above and other features and advantages of the present invention are described more fully in the following description of a preferred embodiment, a better understanding of which may be had by reference to the drawings, in which.

DETAILED DESCRIPTION OF A PREFERRED EMBODIMENT

Figure 1:
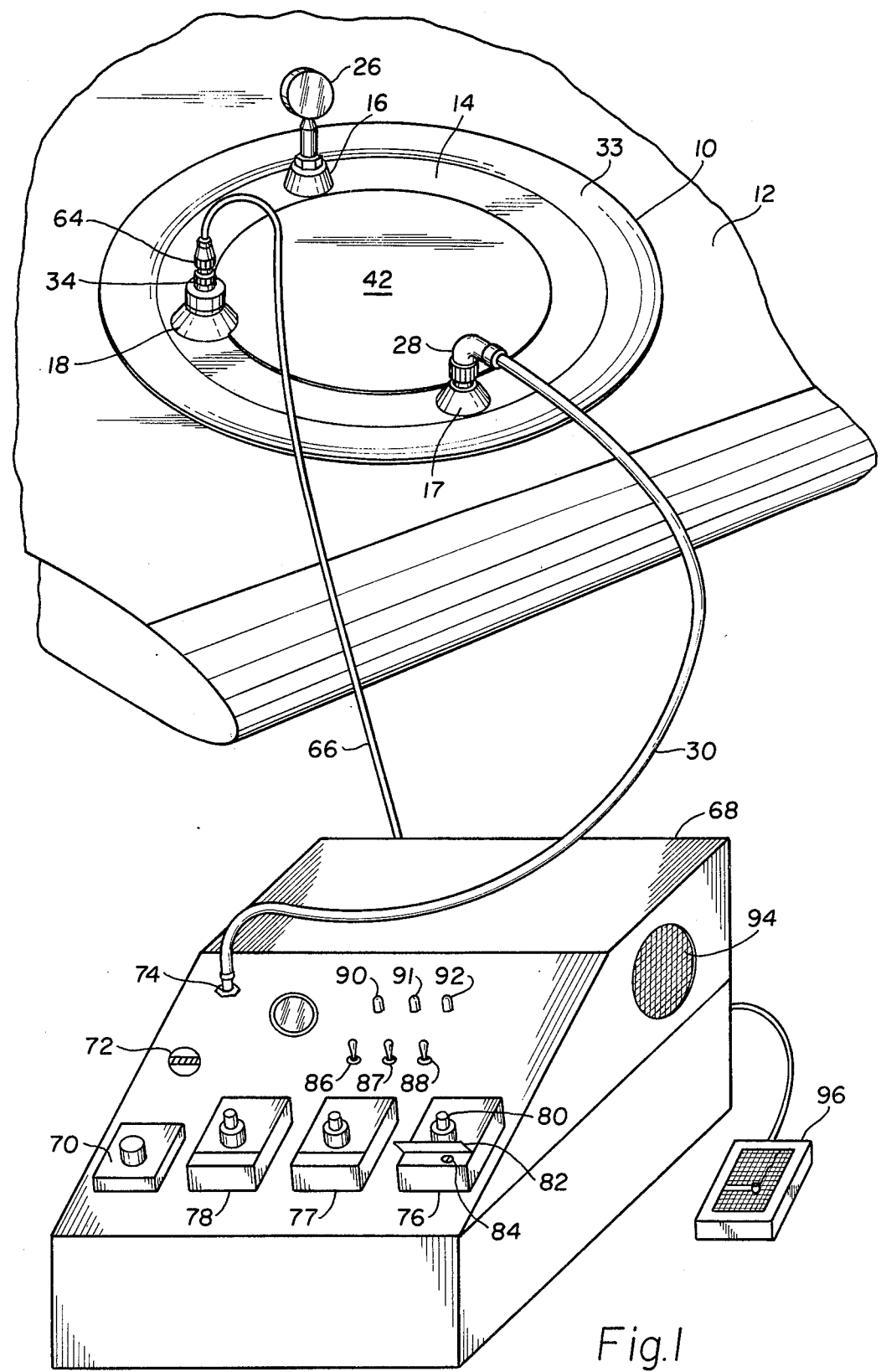
FIG. 1 is an isometric view of a composite repair apparatus a vacuum diaphragm/heating blanket positioned on a surface to be repaired.

Referring to FIG. 1, a diaphragm 10 is shown in position over a damaged portion of a composite surface 12. While the embodiment described herein incorporates a diaphragm sized for a one foot diameter circular patch area, other shapes and sizes would not, of course, be beyond the spirit of the present invention.

Figure 2:
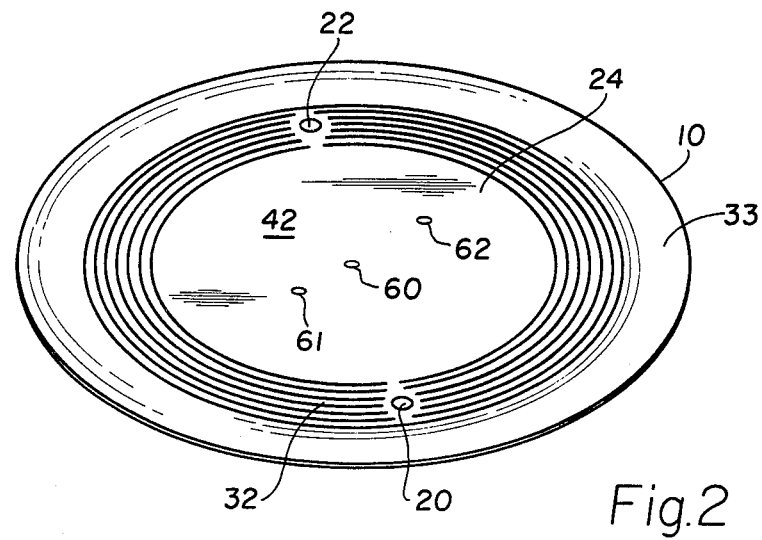
FIG. 2 is an isometric view of the diaphragm of FIG. 1 from a different perspective.

Diaphraghm 10 is constructed of a flexible non-porous material capable of withstanding heat in the range of the curing temperature of the composite patch material employed, typically 350° F. to 400° F. The top surface 14 of diaphragm 10 serves as a base for grommets 16, 17 and 18 formed integrally therewith. Openings 20 and 22 in grommets 16 and 17 communicate with the bottom surface 24 (FIG. 2) of diaphragm 10 which faces the surface 12 to be patched. Mounted in grommet 16 is a vacuum gauge 26, while grommet 17 serves to mount a fitting 28 which in turn is connected to vacuum hose 30. As seen in FIG. 2, the bottom surface 24 of diaphragm 10 includes a series of concentric grooves 32 in communication with vacuum gauge 26 and valve 28 by means of openings 20 and 22. A vacuum seal is formed between surface 12 and the bottom surface 24 of diaphragm 10 by flange 33 located outwardly of grooves 32.

Figure 3:
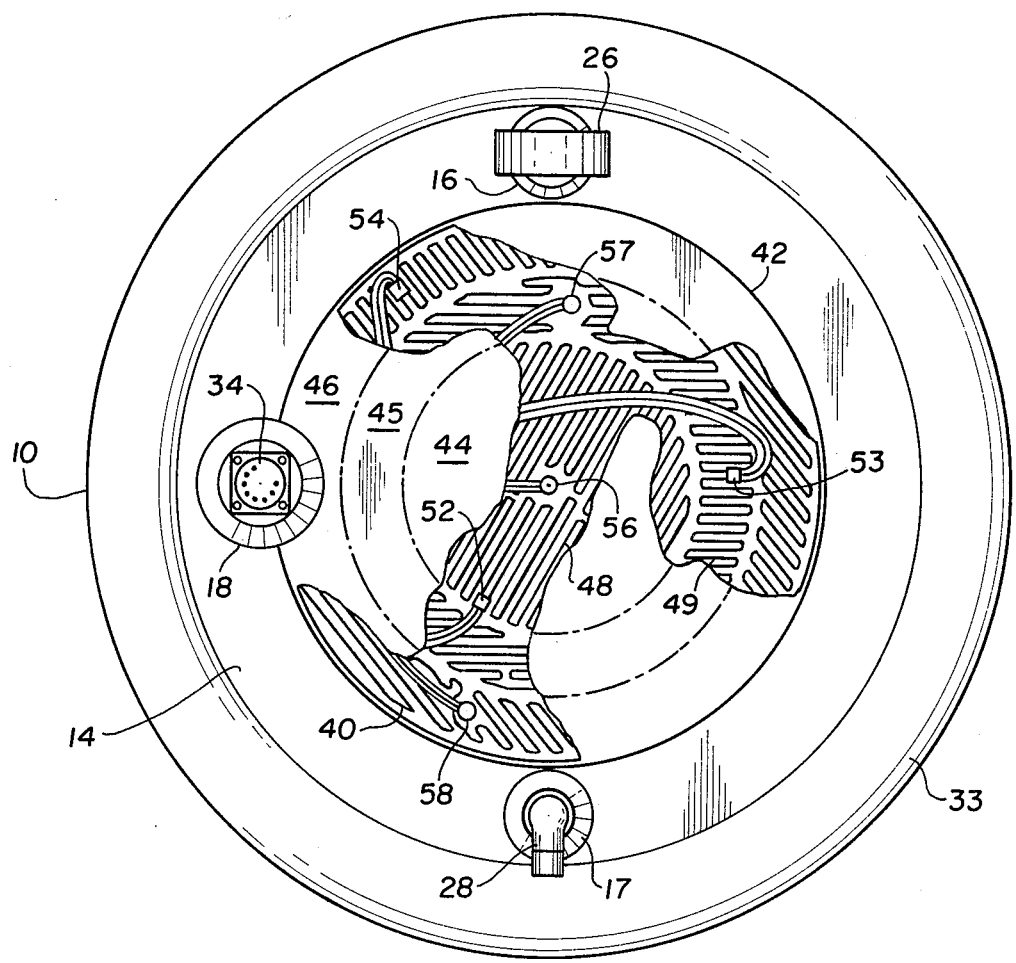
FIG. 3 shows a partially cut away top view of a portion of the diaphragm of FIG. 1 showing the integrally contained heating element.

Grommet 18 houses an electric plug 34 which is connected to a heating element 40 integrally formed within a central area 42 of diaphragm 10. FIG. 3 shows diaphragm 10 partially cut away to expose heating element 40.

Referring more particularly to FIG. 3, heating element 40 is seen to comprise three heating zones: a central zone 44, an intermediate zone 45 and an outer zone 46. It has been determined in a construction realized as of this writing that three zones of varying heat watt density will adequately compensate for the greater heat loss at the outer area of a patch up to one foot in diameter. Therefore, this is the dimension of the heating element in the preferred embodiment described herein. Each heating zone is integrally formed within an area of the diaphragm 10 to register with an area on the surface to be patched. One skilled in the art will appreciate that different numbers and geometric arrangements of heating zones may be used in conjunction with different sizes and shapes of heating elements without departing from the spirit of the present invention.

The surface power density of each heating zone is chosen to correspond to the maximum heat loss density of the patch area with which the heating zone registers. That is, the power density must be large enough to heat the patch to the desired curing temperature at a desired rate, and to maintain the patch at that temperature. In the preferred embodiment realized as of this writing heating zones 44, 45 and 46 are arranged concentrically, with central zone 44 having a maximum power dissipation of between five and ten watts per square inch.

Heating resistors 48, 49 and 50 are arranged to uniformly cover respective heating zones 44, 45 and 46. Input terminals 52, 53 and 54 of respective heating resistors 48, 49 and 50 are, in turn, separately connected to plug 34. The angular separation of the resistor input terminals is preferably 120° in order to minimize the possibility of short circuits and to improve heat dissipation in the areas around the input terminals.

Temperature probes 56, 57 and 58 are located respectively in centrally placed locations 60, 61 and 62 in corresponding heating zones 44, 45 and 46. Probes 56, 57 and 58 communicate with the bottom surface 24 of diaphragm 10 and directly contact the surface being repaired. Each of the probes comprises a thermistor preferably having a measured resistance in the range of 635 to 695 ohms at room temperature (60°–80° F.).

A socket 64 adapted to fit on plug 34 is connected to one end of cable 66. A common ground may be used for the heating resistors. Preferably, a second ground is used for the temperature probes, giving a total of eight separate conductors in cable 66. As seen in FIG. 1, vacuum hose 30 and cable 66 are connected to a control panel 68. Included on control panel 68 are a control timer 70, elapsed time indicator 72, vacuum connection 74 and temperature control units 76, 77 and 78.

Control timer 70 includes shut off controls for both a vacuum drawing means and the temperature control units, and is set by the operator for a desired total curing cycle time. This time should include: (1) a warm up period for the patch to be heated to curing temperature; (2) a curing period as required for the patch material used; and (3) a cool down period sufficient to allow the patch to cool to a desired temperature before releasing the vacuum, preferably 150° F. The only critical feature of the cool down period is that the vacuum be maintained at least beyond cooling to 150° F. or less; therefore, a longer period may be used. Since 45 minutes is generally sufficient for this cool down period, a standard one hour cool down period is automatically programmed into control timer 70. That is, in calculating the total curing cycle time, the operator need only determine the warm-up period and the curing period, then add an hour for the cool down period. The control timer 70 will automatically shut off the power to the temperature control units one hour before the total curing cycle time has elapsed, and shut down the vacuum means when the total curing cycle time has completely elapsed. The remaining time in the total curing cycle may be read directly from the control timer 70, while the elapsed time since the beginning of the curing cycle is indicated by elapsed time indicator 72.

Vacuum connection 74 provides access to a vacuum pump enclosed within control panel 68. The vacuum pump remains on during the entire curing cycle. Preferably, the vacuum pump should be capable of pumping 0.5 cubic feet per minute at 20 inches of mercury vacuum, with an ultimate vacuum of 26 inches of mercury. A suitable unit is Model No. 0522-V103-G18DX, manufactured by Gast Manufacturing Co.

Temperature control units 76, 77 and 78 control the power supply to heating zones 44, 45 and 46 respectively. Since the units 76, 77 and 78 are identical in design, only temperature control unit 76 will be described in detail.

On the front of unit 76 is a temperature control knob 80 which the operator may set to a desired curing temperature between 50° and 450° F. Circuitry in unit 76 is connected by means of cable 66 to heating resistor input terminal 52 and temperature probe 56, and operates to maintain the system temperature as indicated by the temperature probe by controlling the output current to the heating resistor. Preferably the operating or input voltage may be either 115 or 230 VAC, ±15%, at either 50 or 60 Hertz, and the output control to the heating resistor 48 is by means of a 15 amp solid state relay. Another preferred feature is a probe protection switch which will de-energize the relay if a short or open circuit is detected in the temperature probe 56. Still another preferred protection feature is a hi limit switch with a manual reset which will de-energize the relay should the system temperature rise more than 25° F. above the temperature set by knob 80.

A flip up panel 82 on unit 76 exposes a screw 84 which may be adjusted to vary the rate of temperature rise. Switches 86, 87 and 88 control the power to the heating element 40, the vacuum pump, and the control timer 70 respectively. Lamps 90, 91 and 92 indicate the operational condition of heating element 40, vacuum pump and control timer 70.

The control panel 68 is provided with a cooling fan, and cooling vent 94. A strip chart recorder 96 may be connected to temperature probe 57 through the back of panel 68.

The foregoing description of a preferred embodiment is presented by way of example, it being understood that the scope of the present invention is as set forth in the following claims.

What is claimed is:

1. A portable composite repair apparatus comprising:
   a flexible, non porous diaphragm which may be fitted over a composite patch which has been placed on a surface to be patched;
   a plurality of resistive heating elements, each of said resistive heating elements being integrally formed within the diaphragm and having a surface power density corresponding to a maximum heat loss density of an area on the surface to be patched with which said resistive heating element registers; and
   a like plurality of temperature control units, each of which may be adjusted to control a rate of temperature rise and an ultimate curing temperature in an associated resistive heating element.

2. The apparatus of claim 1 which further comprises:
   a plurality of ridges defining a series of concentric grooves on a side of the diaphragm which faces the surface to be patched; and
   a means for applying a vacuum to the concentric grooves whereby a chamber formed by the diaphragm and the surface to be patched may be substantially evacuated to collapse the diaphragm against the surface to be patched;

3. The apparatus of claim 2 which further comprises a timer control which may be set for a desired total curing cycle time and will shut off the resistive heating elements a predetermined period before the desired total curing cycle time has elapsed, and shut down the vacuum application means when the desired total curing time has completely elapsed, whereby the curing of a composite patch may be accomplished automatically.

4. The apparatus of claim 1 which further comprises a plurality of temperature probes in one-to-one correspondence with the resistive heating elements and the control circuits, each of said temperature probes being implanted in the area of the diaphragm of a corresponding heating zone to directly contact the surface to be patched, each of said temperature probes being electrically connected to the corresponding control circuit.

5. A portable composite repair apparatus comprising:
   a flexible, non-porous diaphragm which may be fitted over a composite patch which has been placed on a surface to be patched, said diaphragm having a series of concentric grooves on a side thereof which faces the surface to be patched;
   a means for applying a vacuum to the concentric grooves whereby a chamber formed by the diaphragm and the surface to be patched may be substantially evacuated to collapse the diaphragm against the surface to be patched;
   a plurality of resistive heating elements, each of said resistive heating elements being integrally formed within the diaphragm in an area within the periphery of the concentric grooves, each element having a surface power density corresponding to a maximum heat loss density of an area on the surface to be patched with which said resistive heating element registers;
   a plurality of temperature probes in one to one correspondence with the heating elements, each implanted in the area of the diaphragm of a corresponding heating zone to directly contact the surface to be patched;
   a plurality of control circuits in one to one correspondence with the heating elements, each including thermostat means electrically connected to a corresponding temperature probe and current limiting means adjustable to control a rate of temperature rise of an associated heating element, each of said thermostat means being adjustable to control an ultimate curing temperature to which the composite patch is subjected by the associated heating zones; and
   a timer control which may be set for a desired total curing cycle time and will shut off the resistive heating zones a predetermined period before the desired total curing cycle time has elapsed and will shut down the vacuum application means when the desired total curing cycle time has completely elapsed.

6. The apparatus of claim 5 which further comprises a strip chart recorder connected to at least one of the temperature probes, whereby a temperature versus time plot of a curing cycle for the surface to be patched may be recorded.

7. The apparatus of claim 5 which further comprises a vacuum gauge connected to the chamber formed by the diaphragm and the surface to be patched, whereby a pressure exerted on the surface to be patched by the diaphragm may be determined.

* * * * *